(12) United States Patent
Worrell et al.

(10) Patent No.: US 7,805,053 B2
(45) Date of Patent: Sep. 28, 2010

(54) EXPLOITATION OF DISCONTINUITY INDICATOR FOR TRICK MODE OPERATION

(75) Inventors: Charles William Worrell, Carmel, IN (US); Janghwan Lee, Westfield, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 1227 days.

(21) Appl. No.: 10/565,140

(22) PCT Filed: Jul. 9, 2004

(86) PCT No.: PCT/US2004/021917
§ 371 (c)(1),
(2), (4) Date: Jan. 19, 2006

(87) PCT Pub. No.: WO2005/029854
PCT Pub. Date: Mar. 31, 2005

(65) Prior Publication Data
US 2006/0171659 A1 Aug. 3, 2006

Related U.S. Application Data

(60) Provisional application No. 60/488,835, filed on Jul. 21, 2003.

(51) Int. Cl.
H04N 5/76 (2006.01)
(52) U.S. Cl. .......................... 386/68; 386/69
(58) Field of Classification Search ............ 386/1, 386/6–8, 33, 68–69, 81–82, 111–112, 125–126
See application file for complete search history.

(56) References Cited

U.S. PATENT DOCUMENTS 6,031,960 A 2/2000 Lane
6,501,743 B1 12/2002 Kim et al.
7,092,411 B2 8/2006 Ono et al.

(Continued)

FOREIGN PATENT DOCUMENTS

CN 1287746 3/2001

(Continued)

OTHER PUBLICATIONS

Search Report dated Apr. 11, 2004.

*Primary Examiner*—Thai Tran
*Assistant Examiner*—Nigar Chowdhury
(74) *Attorney, Agent, or Firm*—Robert D. Shedd; Robert B. Levy; Wan Yee Cheung

(57) ABSTRACT

A system and a method for modifying a stream of multimedia content to implement trick mode playback functions in MPEG receivers that do not follow general MPEG trick mode implementation recommendations. The system can include a processor that sets a discontinuity indicator in an adaptation field associated with a video frame. A substitute program clock reference (PCR) value also can be set in the adaptation field. The substitute PCR value can be set to a value approximately equal to a presentation time stamp (PTS) of the video frame with which the adaptation field is associated. The processor also can insert an adaptation field with at least one video frame with which an adaptation field was not already associated. The processor also can remove at least one video frame from the stream of multimedia content. Adaptation fields associated with the removed video frame also can be removed.

14 Claims, 3 Drawing Sheets

U.S. PATENT DOCUMENTS

| | | |
|---|---|---|
| 7,133,481 B2 | 11/2006 | Azakami et al. |
| 7,292,782 B2 * | 11/2007 | Sugahara et al. ............ 386/109 |
| 7,313,315 B2 * | 12/2007 | Morris et al. ................. 386/95 |
| 2002/0037161 A1 | 3/2002 | Sugahara et al. |
| 2002/0054608 A1 | 5/2002 | Wan et al. |

FOREIGN PATENT DOCUMENTS

| | | |
|---|---|---|
| EP | 1052851 | 11/2000 |
| JP | 2002204427 | 7/2002 |
| JP | 2002374430 | 12/2002 |
| JP | 2009247603 | 10/2009 |

* cited by examiner

EXPLOITATION OF DISCONTINUITY INDICATOR FOR TRICK MODE OPERATION

CROSS REFERENCE TO RELATED APPLICATIONS

This application claims the benefit, under 35 U.S.C. §365 of International Application PCT/US2004/021917, filed Jul. 9, 2004, which was published in accordance with PCT Article 21(2) on Mar. 21, 2005, in English and which claims the benefit of U.S. provisional patent application No. 60/488,835, filed Jul. 21, 2003.

GOVERNMENT RIGHTS IN THIS INVENTION

Not Applicable.

FIELD OF THE INVENTION

The inventive arrangements relate generally to video systems and more particularly to systems that perform trick mode operations on streams of multimedia content.

BACKGROUND OF THE INVENTION

Multimedia content is often digitally encoded in a compressed format to minimize an amount of storage necessary to store the multimedia content and to minimize the amount of bandwidth necessary for propagating the multimedia content to content viewers. One digital compression format that is currently very popular is the Moving Pictures Expert Group (MPEG) format. Digital television broadcast systems typically stream MPEG encoded multimedia content to digital television receivers which decode the MPEG stream for presentation onto a display, such as a television.

MPEG streams contain program clock references (PCRs) that are associated with each frame and delivered in what is called an adaptation field. PCRs are count values based on a local 27 MHz clock contained within an encoder—called a system time clock (STS)— that encodes the MPEG stream. The PCRs are used to synchronize a decoders local system time clock (LSTC) with the STS of the encoder. MPEG streams oftentimes also contain a presentation time stamp (PTS) for each coded picture in the MPEG streams. The PTS indicates the instant at which an encoded picture or audio block should be removed from the receiver buffer, instantaneously decoded, and presented for display.

When viewing multimedia content received in an MPEG stream, some viewers may wish to perform certain trick modes. A trick mode can be any playback of multimedia in which the playback is not done at normal speed or in a forward direction. Examples of trick modes are fast-forward, rewind, pause, etc. When a trick mode is to be performed on multimedia content decoded from an MPEG stream, it is recommended that the decoder ignore the PCR values and decode and display frames as they become available.

To implement this process, a DSM_trick_mode_flag is set to 1 within each packetized elementary stream (PES) of the MPEG stream that is processed during trick mode playback. When the DSM_trick_mode_flag is set to 1, it is generally recommended that the decoder neglect vbv_delay and temporal_reference values, and consecutively decode each picture, displaying it until a next picture is decoded. The vbv_delay is a 16 bit unsigned integer representing the number of 90 kHz clock periods between entering a picture's start code into a buffer and removing and decoding the entire picture. The temporal_reference value indicates an order in which MPEG Intra pictures, predicted pictures and bidirectional pictures (I, P and B frames, respectively) should be displayed. Some digital television receivers, such as Advanced Television Systems Committee (ATSC) receivers, do not follow the general recommendation, however. In consequence, such non-compliant receivers attempt to use the PTS and PCR values from the bitstream to decode and display video. Accordingly, these non-compliant receivers do not properly implement trick-mode playback.

SUMMARY OF THE INVENTION

The present invention relates to a system and a method for modifying a stream of multimedia content to implement trick mode playback functions in MPEG receivers that do not follow general MPEG trick mode implementation recommendations, such as Advanced Television Systems Committee (ATSC) receivers. The system can include a processor that sets a discontinuity_indicator in an adaptation field associated with a video frame. The processor also sets a substitute program clock reference (PCR) value in the adaptation field. The substitute PCR value can be set to a value approximately equal to a presentation time stamp (PTS) of the video frame with which the adaptation field is associated. Additionally, the processor can insert an adaptation field with at least one video frame with which an adaptation field was not already associated. The processor also can remove at least one video frame from the stream of multimedia content. Adaptation fields associated with the removed video frame can be removed as well.

BRIEF DESCRIPTION OF THE DRAWINGS

Preferred embodiments of the present invention will be described below in more detail, with reference to the accompanying drawings, in which.

DETAILED DESCRIPTION

The present invention relates to a method for performing trick mode operations using a digital television receiver which is not preconfigured for such operations. The trick mode operations are implemented by manipulating timing information within a delivered stream of multimedia content to control an amount of time each video frame (frame) within the stream is buffered. More particularly, adaptation fields can be added in a Moving Pictures Expert Group (MPEG) stream. Discontinuity_indicators in the adaptation fields can be set to indicate a discontinuity in the MPEG stream. Further, program clock references (PCRs) contained in the adaptation fields can be set to substitute values which cause playback of the MPEG stream to change in accordance with a desired trick mode, as is discussed below in further detail. Accordingly, trick mode playback functions can be implemented in MPEG receivers that do not follow general MPEG trick mode implementation recommendations, such as Advanced Television Systems Committee (ATSC) receivers.

Figure 1:
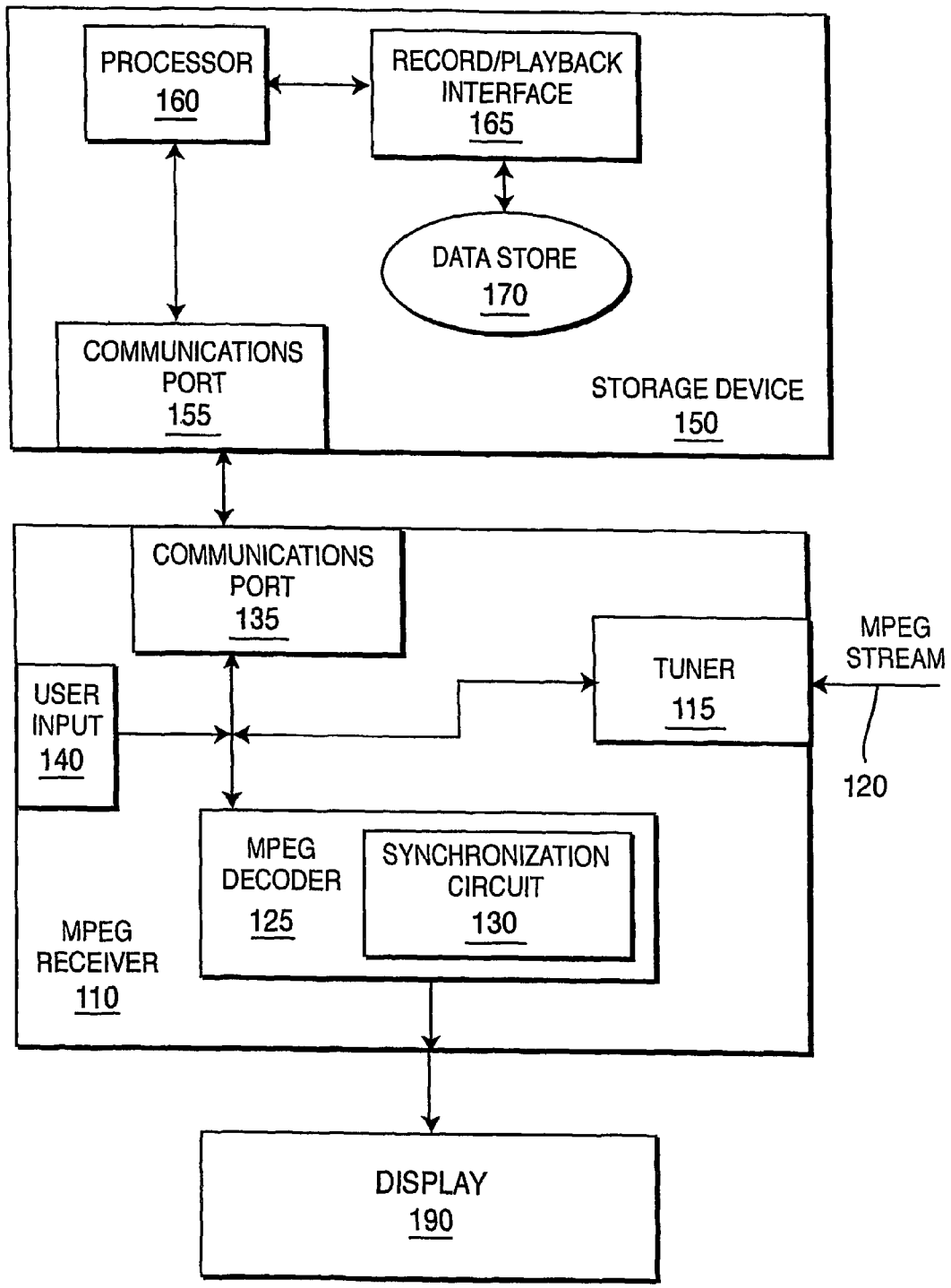
FIG. 1 shows block diagram of a system, which is useful for understanding the present invention.

A block diagram of a system 100 useful for understanding the present invention is shown in FIG. 1. The system 100 can include a display 190, a storage device 150 and an MPEG receiver 110. MPEG receivers are known to the skilled artisan. One such receiver is an Advanced Television Systems Committee (ATSC) receiver, which can also include the display 190 as an integral element. In a typical arrangement, the MPEG receiver 110 can comprise a tuner 115 for selectively receiving an MPEG stream 120. For example, the tuner 115 can be communicatively connected to an antenna, a television cable system, the Internet, or any other device or system, which can provide the MPEG stream 120 to the tuner 115.

The MPEG receiver 110 also can include a user input 140 which can receive user input commands, for example from a keypad, a remote control interface and/or any other user interface devices. The user input commands can be propagated to components within the MPEG receiver 110 which process the user commands. For instance, the user commands can be propagated to the tuner 115. User commands also can be propagated to the storage device 150 to initiate various storage device operations, such as data storage and trick mode operations.

Additionally, the MPEG receiver 110 can include an MPEG decoder 125 for decoding the MPEG stream 120 into uncompressed audio/video streams for presentation on the display 190. The MPEG decoder 125 can include a synchronization circuit 130, which is discussed in further detail with reference to FIG. 3. Such MPEG decoders 125 are known to the skilled artisan. The MPEG decoder 125 can be communicatively linked to a communications port 135. The communications port 135 can be any port suitable for bi-directional communication of MPEG streams between the MPEG receiver 110 and one or more other devices. For instance, the communications port 135 can be communicatively connected to the storage device 150, which also can include a communications port 155 that supports bi-directional communication of MPEG streams. In one arrangement, the communications ports 135, 155 can be IEEE-1394 (FireWire) ports or a universal serial bus (USB) ports which are operationally connected.

The storage device 150 also can comprise a processor 160 for processing MPEG streams, a data store 170 for storing MPEG streams, and a record/playback interface 165 for interfacing the data store 170 with other storage device components. The processor 160 can be a central processing unit (CPU), a digital signal processor (DSP), an application specific integrated circuit (ASIC), or any other processor suitable for processing MPEG streams. The data store 170 can be any storage, which can store MPEG data. For instance, the data store can comprise random access memory (RAM), flash memory, a magnetic storage medium (e.g. a hard disk drive), an optical storage medium, a magneto-optical storage medium, or any other suitable data store.

In operation, the tuner 115 can be tuned to select the MPEG stream 120. In a first playback mode, the tuner 115 can propagate the MPEG stream 120 to the MPEG decoder 125, which then decodes the MPEG stream and forwards the stream to the display 190. In this playback mode the MPEG decoder 125 decodes the MPEG stream 120 at a rate commensurate with a normal playback speed.

Using the storage device 150, a number of additional playback modes can be implemented by the MPEG receiver 110. For instance, the storage device can be used to implement trick mode playback and time-shifting. In this arrangement, the MPEG stream 120 can be communicated from the tuner 115, through communications ports 135, 155 to the processor 160, to the record/playback interface 165, and finally to the data store 170. (The decision to send the MPEG stream 120 to the storage device, rather than to the MPEG decoder 125 depends on the user command received at the User input 140.) The processor 160 associates an identifier with each frame within the MPEG stream 120. These frame identifiers can be inserted into the MPEG stream 120 before the MPEG stream 120 is stored to the data store 170. The frame identifiers can be a sequence of integers or any other type of identifiers suitable for identifying the frames.

Figure 2:
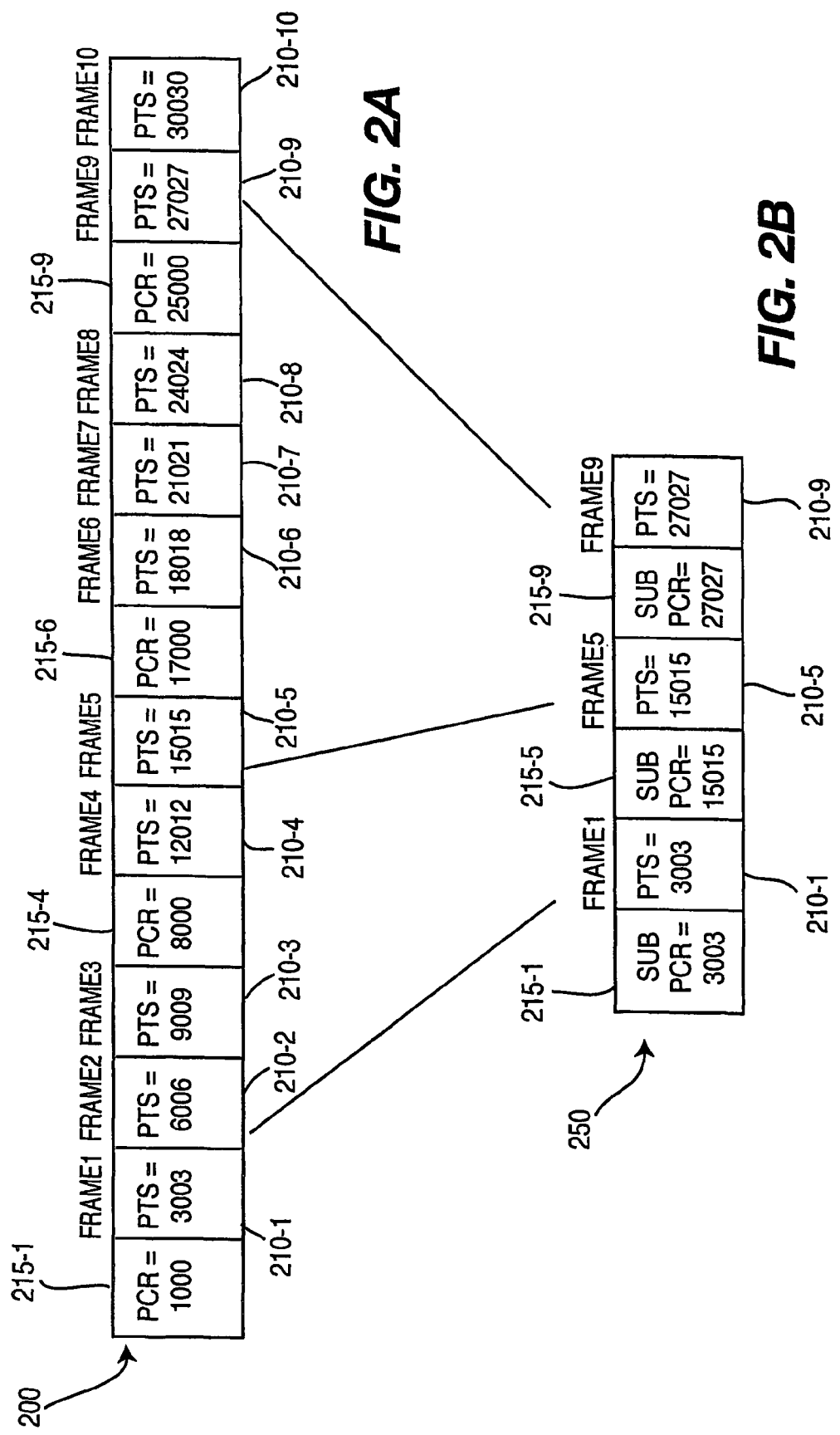
FIG. 2A shows a portion of an MPEG stream, which is useful for understanding the present invention.
FIG. 2B shows a modified version of the MPEG stream of FIG. 2A.

During trick mode playback, the processor 160 typically instructs the record/playback interface 165 to retrieve the MPEG stream 120 from the data store 170. The processor 160 then can modify the MPEG stream to cause the MPEG decoder 125 to playback the MPEG stream in accordance with a desired trick mode. Referring to FIGS. 2A and 2B, an example of MPEG stream modifications which can be implemented to achieve a fast forward trick mode is shown. In the example, a modified MPEG stream 250, shown in FIG. 2B, is derived from an original MPEG stream 200, shown in FIG. 2A. To achieve fast forward play, a number of frames 210 can be removed from the MPEG stream 200. For instance, frames 210-2, 210-3, 210-4, 210-6, 210-7, 210-8 and 210-10 can be removed. Adaptation fields 215, associated with the frames, which were removed, also can be removed. Thus, adaptation fields 215-4 and 215-6 can be removed. Accordingly, frames 210-1, 210-5 and 210-9, and adaptation fields 215-1 and 215-9 remain in the modified MPEG stream 250, as shown in FIG. 2B. Adaptation fields can be added for any frames that do not already have an associated adaptation field. Thus, in the present example adaptation field 215-5 can be added.

The PCR values within the adaptation fields can be set to control the rate at which the synchronization circuit causes the modified MPEG stream 250 to be decoded by the MPEG decoder. For example, the PCR value in each adaptation field can be set with a substitute PCR equal to the PTS value contained in the frame with which the adaptation field is associated. Thus, in the example shown, the PCR value in adaptation field 215-1 can be changed from 1000 to 3003, the PCR value in adaptation field 215-5 can be set to 15015, and the PCR value in adaptation field 215-9 can be changed from 25000 to 27027. The processor also can set a discontinuity_indicator to a value of 1 in each adaptation field prior to the frame being delivered to the MPEG decoder. The discontinuity_indicator indicates that there has been a discontinuity in the modified MPEG stream. When this occurs, the decoder must load the substitute PCR in the adaptation field into a counter of the decoder 130 which generates a local system time clock (LSTC), as is discussed in further detail with reference to FIG. 3.

Figure 3:
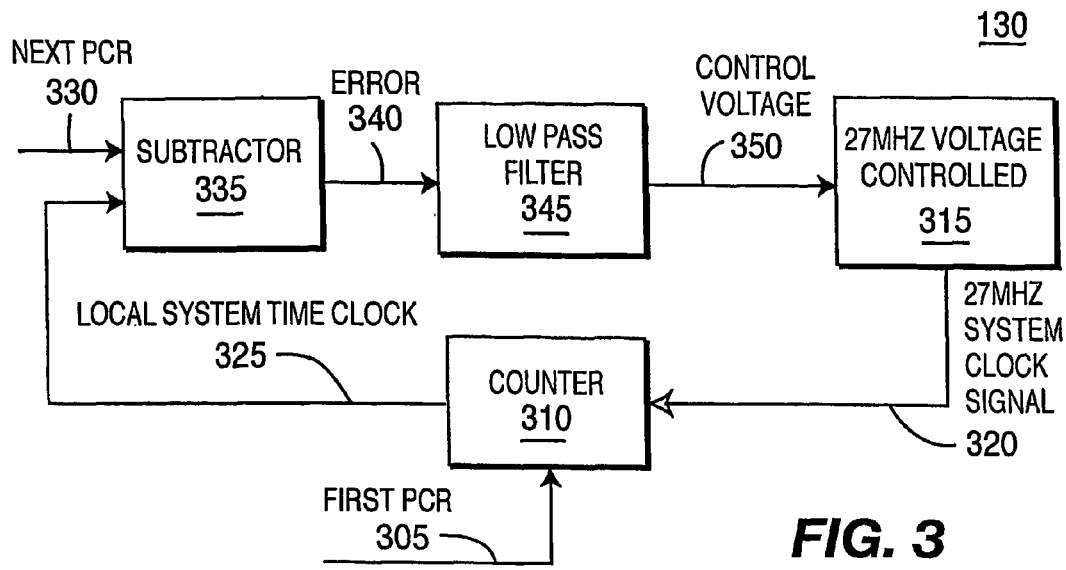
FIG. 3 shows an MPEG decoder synchronization circuit useful for understanding the present invention.

Referring to FIG. 3, a block diagram of the MPEG synchronization circuit 130 is shown. The synchronization circuit 130 is a closed loop control circuit, which is typical for synchronization circuits contained in MPEG decoders. When the MPEG decoder receives a typical, unmodified MPEG stream, the MPEG decoder loads a first PCR 305 from the MPEG stream into a counter 310 clocked by a voltage controlled oscillator 315. In general, the voltage controlled oscillator 315 outputs a 27 MHz system clock signal 320. A first PCR 305 is used to establish an initial count value which the counter 310 increments in accordance with the system clock signal 320 to generate an LSTC 325. When a next PCR 330 is received, it is compared against the LSTC 325 in a subtractor 335. The subtractor 335 outputs an error signal 340 representing a difference between the LSTC 325 and the value of the next PCR 330. If the value of the LSTC 325 output precisely matches the next PCR 330, then the error signal 340 will have a value of zero, which indicates that the LSTC 325 is synchronous with a system time clock (STS) of the encoder. Any differences between the LSTC 325 and the next PCR 330 will cause the error signal 340 to have a non-zero value. The error signal 340 can be filtered by a low pass filter 345 to remove undesired harmonics and generate a control voltage 350. The control voltage 350 then is used as a control signal to adjust the frequency of the voltage controlled oscillator 315 and keep the voltage controlled oscillator 315 locked to the frequency of the system time clock. For instance, if the LSTC 325 has a value higher than the next PCR 330, then the control voltage 350 will cause the frequency of the voltage controlled oscillator 315 to decrease. This may be undesireable for fast motion playback.

Since the values of the PCRs 305, 330 are used to synchronize a decoder's local system time clock (LSTC) with the system time clock of an encoder, the adaptation fields of the modified MPEG stream can be set to effectively disable the frequency adjustment process of synchronization circuit 130. In particular, setting the discontinuity_indicator in each adaptation field causes each substitute PCR to be loaded into the counter 310 as a new PCR 305, and thus re-set the LSTC 325 to the new substitute PCR value. Hence, the subtractor 335 will not receive a next PCR 330 and will not generate an error signal 340. Accordingly, the frequency of the voltage controlled oscillator 315 will not decrease in response to the modified PCR values.

Moreover, each substitute PCR value can be loaded into the counter 310 to establish the new LSTC 325 prior to its associated frame being delivered to the MPEG decoder. Thus, by the time the frame is delivered to the MPEG decoder, the time represented by the frame's PTS will already have passed. Accordingly, the MPEG decoder will immediately decode the frame and forward the frame to the display, without any added buffer delay. In consequence, the modified MPEG stream will be presented as a fast motion trick mode.

Figure 4:
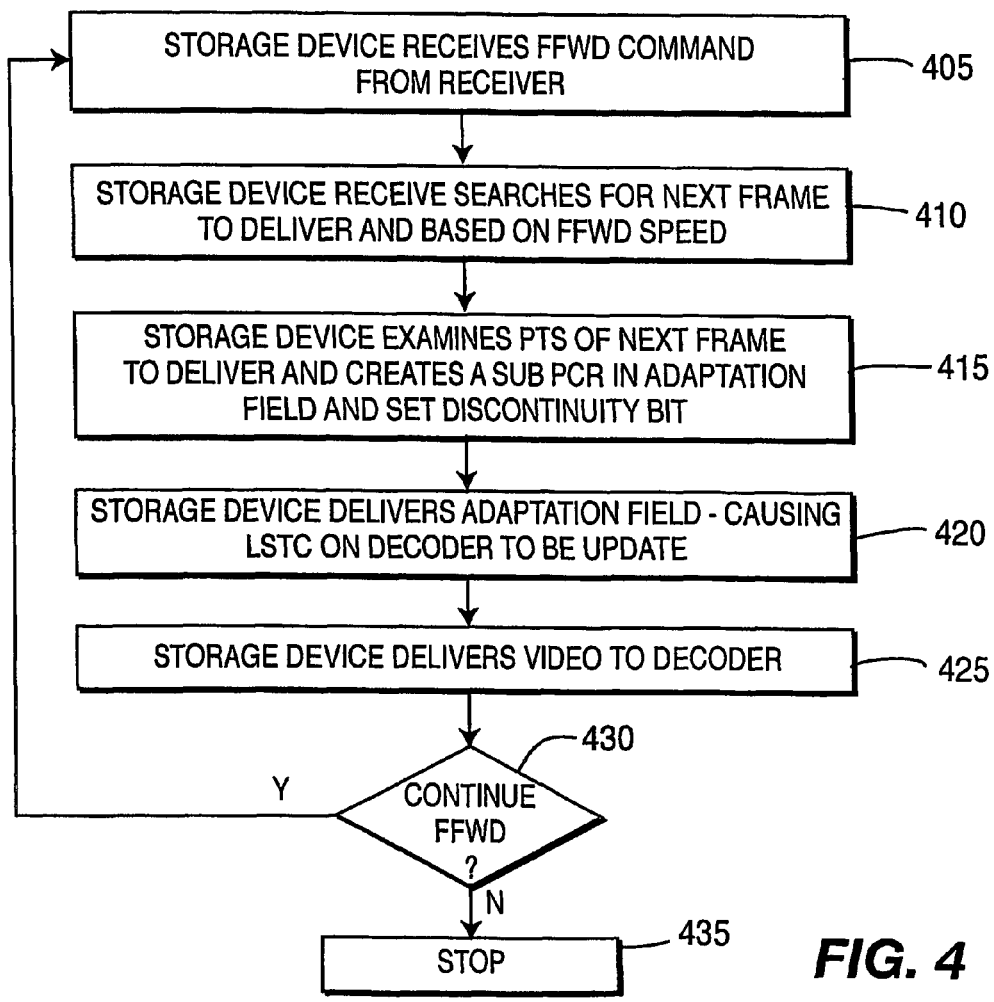
FIG. 4 shows a flow chart useful for understanding an embodiment of the present invention implementing fast forward playback.

A flow chart useful for understanding the present invention is shown in FIG. 4. Beginning at step 405, the storage device can receive a fast forward command from the receiver, for instance a fast forward command entered by a user. The storage device can search for a next frame to deliver based on the fast forward speed, as shown in step 410. Proceeding to step 415, the storage device can examine the PTS of the next frame to deliver and create a substitute PCR in the adaptation field and set the discontinuity_indicator. Continuing to step 420, the storage device can deliver the adaptation field to the MPEG decoder, which causes the LSTC of the MPEG decoder synchronization circuit to be updated with the new substitute PCR value. At step 425, the storage device then can deliver the frame correlating to the adaptation field to the MPEG decoder. Referring to decision box 430, step 435, and again to step 410, the process can repeat until fast forward process is stopped.

At this point is should be noted that while the foregoing describes the fast forward trick mode, the present invention also can be used to implement other trick modes. For example, PCR values can be set to substitute values which are significantly lower than PTS values of associated frames. Accordingly, the MPEG decoder can be forced to buffer frames for a time period longer than with normal playback. Frames that are currently being displayed can be repeated until the frames in buffer are released to be decoded and displayed. It also should be noted that other and further embodiments of the invention may be devised without departing from the basic scope thereof, and the scope thereof is determined by the claims that follow.

The invention claimed is:

1. A method for modifying a stream of multimedia content to implement trick mode playback on a playback device, the method comprising:
    setting a discontinuity indicator in an adaptation field associated with a video frame to disable a frequency adjustment of a synchronization circuit; and
    setting a substitute program clock reference (PCR) value in the adaptation field to facilitate playback of the multimedia stream on the playback device in accordance with a desired trick mode.

2. The method according to claim 1 further comprising:
    inserting an adaptation field associated with at least one video frame with which an adaptation field was not already associated.

3. The method according to claim 1 wherein said step of setting a substitute PCR value comprises setting the substitute PCR value to a value approximately equal to a presentation time stamp (PTS) of the video frame with which the adaptation field is associated.

4. The method according to claim 1 further comprising removing at least one video frame from the stream of multimedia content.

5. The method according to claim 4 further comprising removing at least one adaptation field associated with the removed video frame.

6. The method according to claim 1, further comprising delivering the modified stream of multimedia content to an MPEG receiver.

7. The method according to claim 6 wherein the MPEG receiver is an Advanced Television Systems Committee (ATSC) receiver.

8. A system for modifying a stream of multimedia content to implement trick mode playback comprising:
    a processor which sets a discontinuity indicator in an adaptation field associated with a video frame to disable a frequency adjustment of a synchronization circuit and sets a substitute program clock reference (PCR) value in the adaptation field to facilitate playback of the multimedia stream in accordance with a desired trick mode.

9. The system according to claim 8 wherein the processor further inserts an adaptation field associated with at least one video frame with which an adaptation field was not already associated.

10. The system according to claim 8 wherein the processor sets the substitute PCR value to a value approximately equal to a presentation time stamp (PTS) of the video frame with which the adaptation field is associated.

11. The system according to claim 8 wherein the processor removes at least one video frame from the stream of multimedia content.

12. The system according to claim 11 wherein the processor removes at least one adaptation field associated with the removed video frame.

13. The system according to claim 8 wherein the modified stream of multimedia content is delivered to an MPEG receiver.

14. The system according to claim 13 wherein the MPEG receiver is an Advanced Television Systems Committee (ATSC) receiver.

* * * * *